United States Patent
Iwashita et al.

(10) Patent No.: US 7,719,218 B2
(45) Date of Patent: May 18, 2010

(54) MOTOR CONTROL APPARATUS

(75) Inventors: Yasusuke Iwashita, Yamanashi (JP);
Takahiro Akiyama, Yamanashi (JP);
Masakazu Niwa, Yamanashi (JP); Geng Li, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 98 days.

(21) Appl. No.: 11/873,653

(22) Filed: Oct. 17, 2007

(65) Prior Publication Data
US 2008/0116833 A1 May 22, 2008

(30) Foreign Application Priority Data
Nov. 20, 2006 (JP) ............ 2006-313438

(51) Int. Cl.
*H02P 7/00* (2006.01)
(52) U.S. Cl. ............ 318/432; 318/433; 318/434
(58) Field of Classification Search ......... 318/432–434
See application file for complete search history.

(56) References Cited

U.S. PATENT DOCUMENTS

| | | | |
|---|---|---|---|
| 5,154,242 A | | 10/1992 | Soshin |
| 6,615,103 B2* | | 9/2003 | Fujishima et al. ........... 700/175 |
| 2004/0070358 A1* | | 4/2004 | Yamada ................ 318/560 |
| 2008/0272725 A1* | | 11/2008 | Bojrup et al. .............. 318/434 |

FOREIGN PATENT DOCUMENTS

| | | |
|---|---|---|
| DE | 4128427 A1 | 3/1992 |
| EP | 0666138 A1 | 8/1995 |
| EP | 1083025 A2 | 3/2001 |
| EP | 1772960 * | 4/2007 |
| JP | 09305235 A | 11/1997 |
| JP | 10090011 A | 4/1998 |
| JP | 2003117879 A | 4/2003 |

OTHER PUBLICATIONS

Extended EP Search Report for EP07020654 dated Mar. 18, 2008.
Notice of Reasons for Rejection for JP2006-313438 mailed May 20, 2008.

* cited by examiner

*Primary Examiner*—Bentsu Ro
*Assistant Examiner*—Erick Glass
(74) *Attorney, Agent, or Firm*—Lowe Hauptman Ham & Berner LLP (57) ABSTRACT

A motor control apparatus for computing or outputting motor load information, comprises: a storage unit which stores a function or table obtained in advance based on parameters used for the computation of the load information and on an actually measured value of a motor output or motor torque; and a load meter computing unit which computes the load information from the function or table stored in the storage unit by using the parameters used for the computation of the load information. With the above configuration, the load meter is computed in such a manner as to accurately indicate the load condition of a motor in real time over the entire speed range of the motor including the nonlinear control region of the motor, and the motor is controlled using the thus computed value or the computed value is displayed on a display unit.

5 Claims, 8 Drawing Sheets

FIG.9
LOAD DISPLAY VALUE ($L_M$) VS. ROTATIONAL SPEED (V) VS. NORMALIZED TORQUE ($T_N$)

MOTOR CONTROL APPARATUS

RELATED APPLICATIONS

The present application is based on, and claims priority from, Japanese Application Number 2006-313438, filed Nov. 20, 2006, the disclosure of which is hereby incorporated by reference herein in its entirety.

BACKGROUND OF THE INVENTION

1. Field of the Invention

The present invention relates to a motor control apparatus which computes a display output to be fed to a load meter for viewing, the load meter being a device that shows the operating condition (load condition) of a spindle motor in a machine tool, wherein the motor control apparatus controls the motor by using the display output.

2. Description of the Related Art

To monitor the operating condition of a spindle motor in a machine tool or the like, motor load information is computed or detected. Conventionally, such motor load information is computed using factors that affect motor output, such as the output power of a motor control apparatus (also called an amplifier), the efficiency of the motor, and a torque command (or electric-current command) for the motor.

A spindle motor used to drive the spindle of a machine tool may be operated even in the nonlinear control region of the motor to achieve high-speed and high-output performance required of it. In that case, torque may not be produced as directed by the torque command, and as a result, the load meter value computed based on the torque command may deviate from the correct value. On the other hand, to monitor tool wear, etc., or to determine the cutting conditions of a machine tool, user demand for accurate display of load meter values is increasing.

Patent Document 1 discloses a method for visually displaying a load meter that enables the operating condition of a motor to be grasped instantly in real time. Generally, in prior art load meters, the load meter value is computed and displayed in the following manner to present the operating condition of a motor for viewing.

Figure 1:
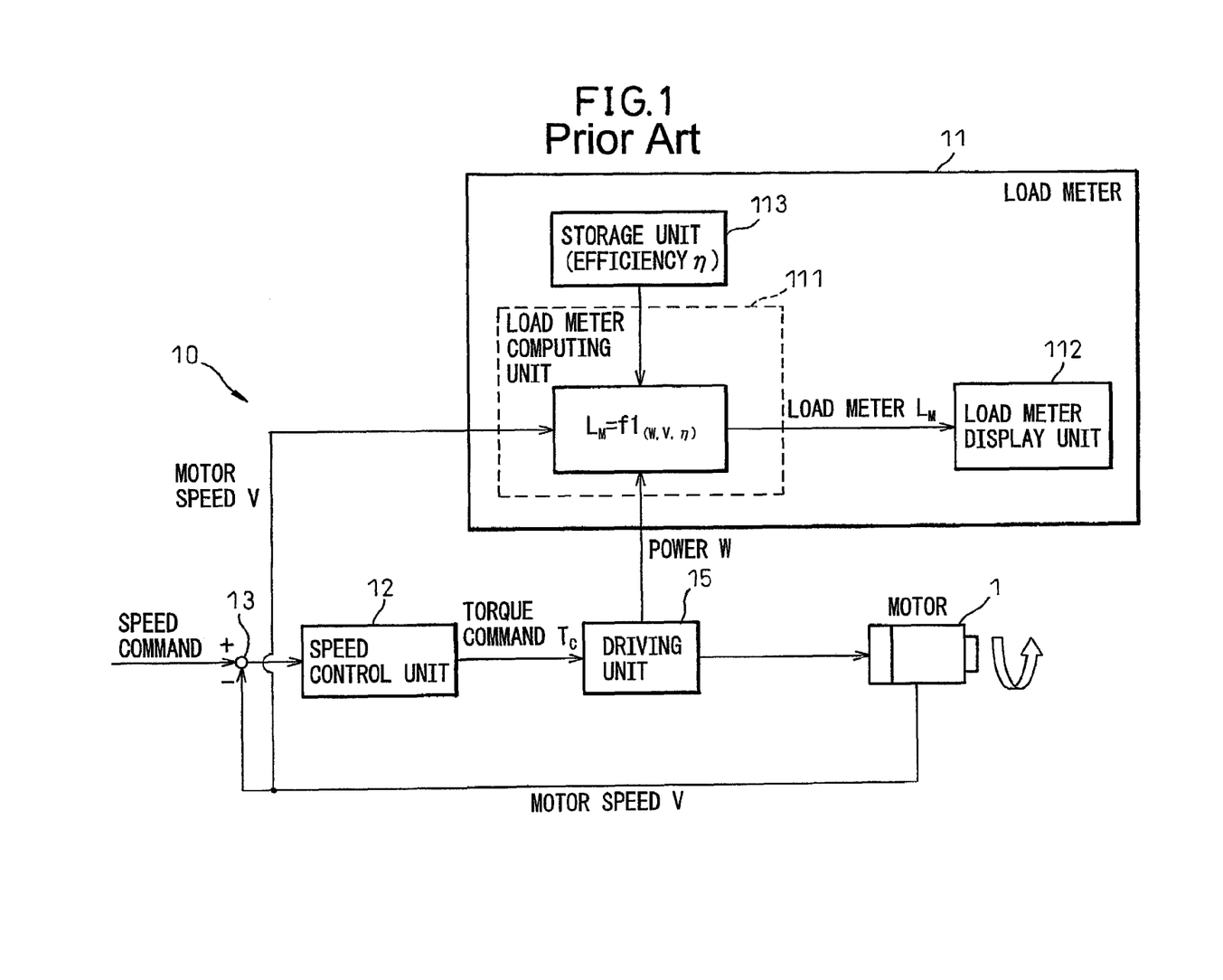
FIG. 1 is a block diagram showing the configuration of a first specific example of a motor control apparatus according to the prior art.

FIG. 1 is a block diagram showing the configuration of a first specific example of a motor control apparatus according to the prior art. In FIGS. 1 to 4 given hereinafter, the same reference numerals indicate the same parts. In FIG. 1, motor control apparatus 10 includes all the parts shown, except motor 1. As shown in FIG. 1, a speed control unit 12 for motor 1 receives an output of an adder 13 which shows the difference between the speed command and the actual speed V of motor 1, and outputs a torque command $T_C$.

As shown in FIG. 1, a load meter 11 in prior art motor control apparatus 10 includes a load meter computing unit 111, a load meter display unit 112, and a storage unit 113. Efficiency η defined by a preset given value is stored in storage unit 113. Load meter 11 monitors the output of a driving unit 15, computes the output power of motor 1 from the output power W of driving unit 15 and the efficiency η of motor 1, and displays it as the load meter value on the display part of load meter display unit 112, or computes the ratio of the thus computed output power of motor 1 to the maximum output power at the corresponding rpm and displays it as the load meter value on the display part of load meter display unit 112.

$L_M$, W, V, and η in the equation $L_M = f1_{(W, V, \eta)}$ shown inside load meter computing unit 111 in FIG. 1 are defined as follows.

Figure 2:
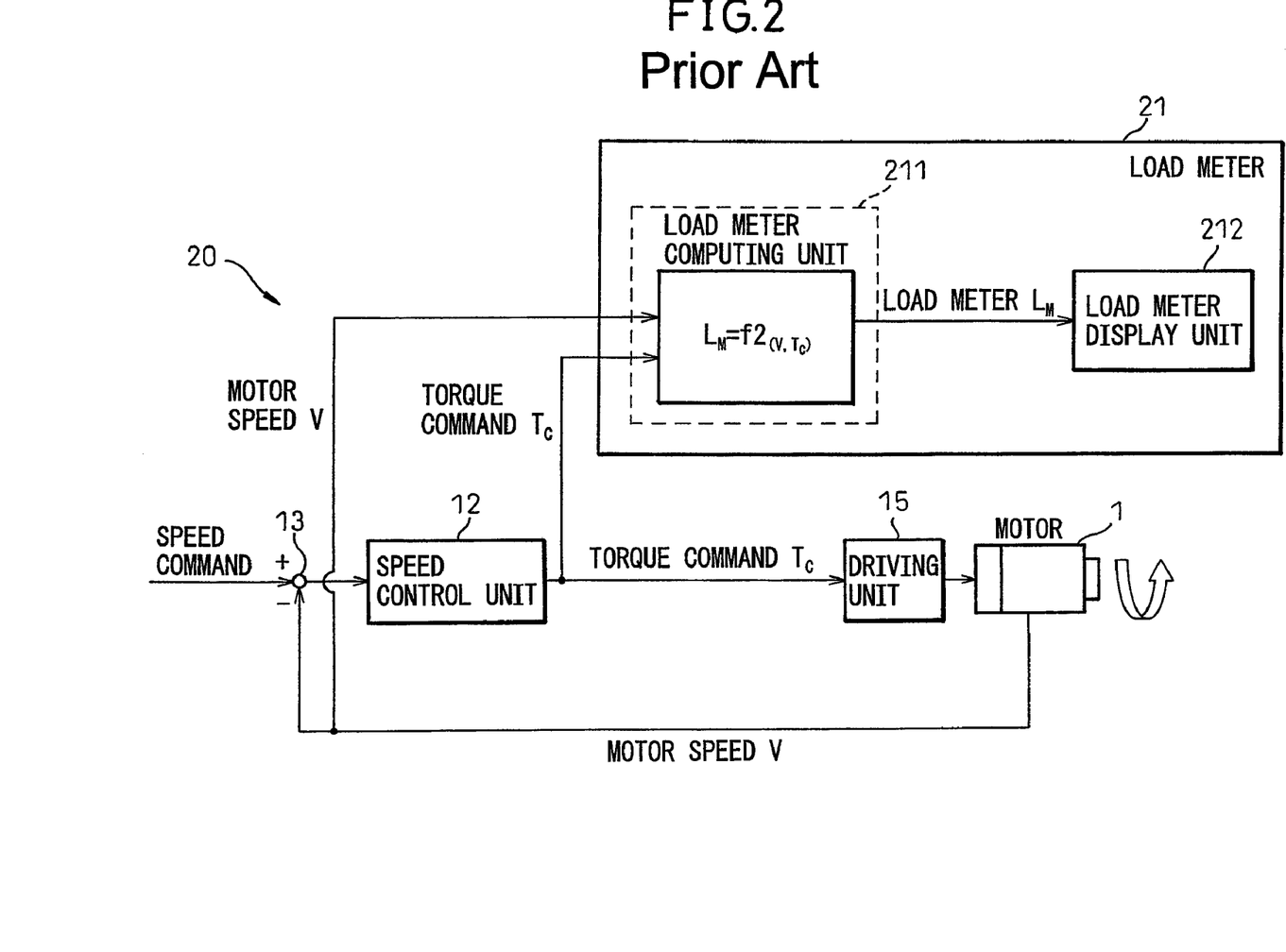
FIG. 2 is a block diagram showing the configuration of a second specific example of a motor control apparatus according to the prior art.

$L_M$: Load meter value, W: Output power of amplifier, V: Actual speed of motor, η: Motor efficiency FIG. 2 is a block diagram showing the configuration of a second specific example of a motor control apparatus according to the prior art. A load meter 21 shown in FIG. 1 includes a load meter computing unit 211 and a load meter display unit 212. Load meter 21 monitors the torque command $T_C$ that a speed control unit 12 outputs (or the electric-current command that the driving unit outputs to control the current supplied to the motor), and displays (as the load meter value) the ratio (in %) of the torque command (electric-current command) $T_C$ to the maximum torque command (electric-current command) corresponding to the motor rpm (motor speed V) at that time.

$L_M$, V, and $T_C$ in the equation $L_M = f2_{(V, TC)}$ shown inside load meter computing unit 211 in FIG. 2 are defined as follows.

$L_M$: Load meter, V: Motor speed, $T_C$: Torque command

[Patent Document 1] Japanese Unexamined Patent Publication No. H10-90011 (refer to [CLAIM 1] in the claims, paragraph numbers [0002] to [0004] in the specification, and FIG. 2)

However, in the case of the load meter shown in FIG. 2, when factors affecting the motor output, such as the torque command (electric-current command) used for controlling the motor, are used to calculate the load of the motor, if the motor enters a nonlinear region (for example, because of the saturation of the motor energization voltage or the saturation of the output voltage of the amplifier) the proportional relationship between the factors, such as the torque command, and the motor output will be lost. The resulting problem is that the load information (load meter) value calculated from these factors deviates widely from the desired value, causing a significant error.

On the other hand, the load meter computation method shown in FIG. 1 involves a problem that the load meter cannot be accurately calculated unless the motor speed and motor efficiency that varies with the load condition are accurately known, because the load meter computing value is affected by the amplifier output power and the motor efficient.

SUMMARY OF THE INVENTION

Accordingly, the present invention which solves the above problems is directed to the provision of a motor control apparatus that computes the load meter in such a manner as to accurately indicate the load condition of the motor in real time over the entire speed range of the motor including the nonlinear control region of the motor, and that controls the motor by using the thus computed value.

In the motor control apparatus according to the present invention that accomplishes the above object, a function (or table) is obtained by actually measuring data representing the relationship between the motor speed, the motor output, and the factors affecting the motor output, and the load information corresponding to the factors affecting the output is accurately computed for any designated motor speed by using the function (or table).

According to a first mode of the present invention that accomplishes the above object, a motor control apparatus for computing or outputting motor load information is characterized by comprising: a storage unit which stores a function or table obtained in advance based on parameters used for the computation of the load information and on an actually measured value of a motor output or motor torque; and a load meter computing unit which computes the load information from the function or the table by using the parameters used for the computation of the load information.

In the motor control apparatus according to the first mode of the present invention, the parameters used for the computation of the load information are an actually measured motor speed and a torque command or electric-current command.

According to a second mode of the present invention that accomplishes the above object, a motor control apparatus for computing or outputting motor load information is characterized in that a function or table for computing a second torque command is obtained in advance from an actually measured motor speed and actually measured torque on an "actually measure speed versus torque command versus torque characteristic" curve by applying a correction so that a first torque command before the correction always matches the actually measured torque, and in that, by using the function or table, the second torque command is input to a driving unit to control motor driving.

In the motor control apparatus according to the second mode of the present invention, the motor load information is computed from the first torque command before the correction.

In the motor control apparatus according to the first or second mode of the present invention, the function or the table is changed in accordance with either motor temperature or supply voltage or both.

DETAILED DESCRIPTION

The embodiments of the present invention will be described below with reference to the drawings.

The present invention assumes the use of the prior art load meter computation method shown in FIGS. 1 and 2, and obtains a function (or table) by actually measuring data representing the relationship between the torque command (or electric-current command) and the motor output over the entire speed range of the motor. Using the function (or table), the load meter value that matches the actual output (torque) of the motor or the motor output (torque) that matches the displayed load meter value is computed.

Figure 3:
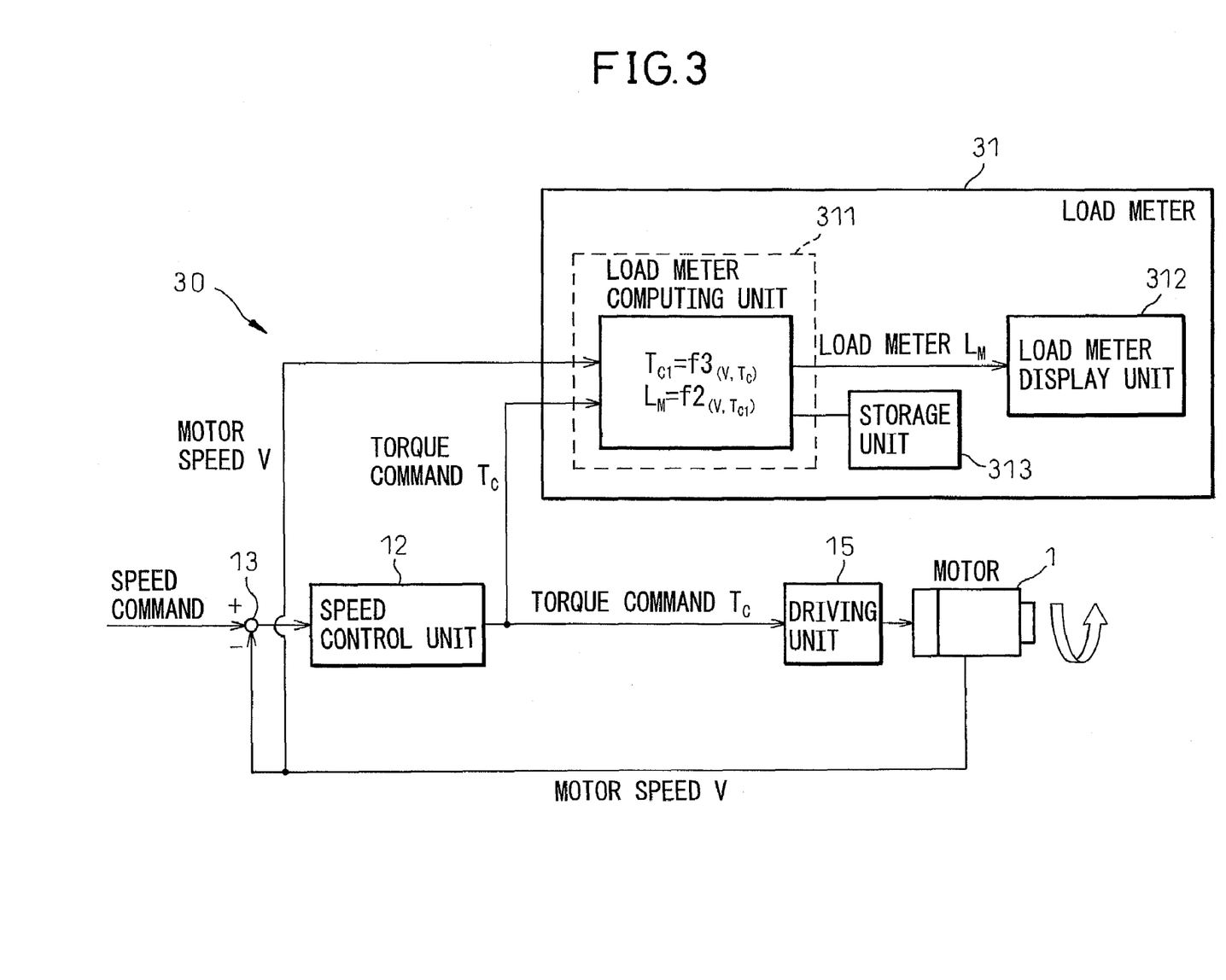
FIG. 3 is a block diagram showing the configuration of a motor control apparatus according to a first embodiment of the present invention.

FIG. 3 is a block diagram showing the configuration of a motor control apparatus according to a first embodiment of the present invention. In FIG. 3, a motor control apparatus 30 includes all the parts shown, except motor 1. As shown in FIG. 3, speed control unit 12 for motor 1 receives an output of adder 13 which shows the difference between the speed command and the actual speed V of motor 1, and outputs a torque command (or an electric-current command which is output from the driving unit to control the current supplied to the motor) $T_C$. As shown in FIG. 3, a load meter 31 in motor control apparatus 30 includes a load meter computing unit 311, a load meter display unit 312, and a storage unit 313. The earlier obtained function or table is stored in storage unit 313.

For motor control apparatus 30, data representing the relationship between the torque command and the motor output is measured over the entire speed range of the motor to obtain the function (or table) $T_{C1}=f3_{(V,TC)}$ ($T_C$: Torque command before correction, $T_{C1}$: Torque command after correction, V: Motor speed), and the function (or table) is stored in storage unit 313 so that it can be used in real time by load meter computing unit 311.

As shown in FIG. 3, load meter computing unit 311 first performs a calculation to correct the torque command and computes the accurate torque command ($T_{C1}$). Then, by substituting the thus computed torque command $T_C$, into the load meter computing function or table ($L_M=f2_{(V,TC1)}$, the correct load meter value (an ideal value that matches the actual torque) can be obtained. The correct load meter value thus obtained can be displayed on the load meter display unit.

Figure 4:
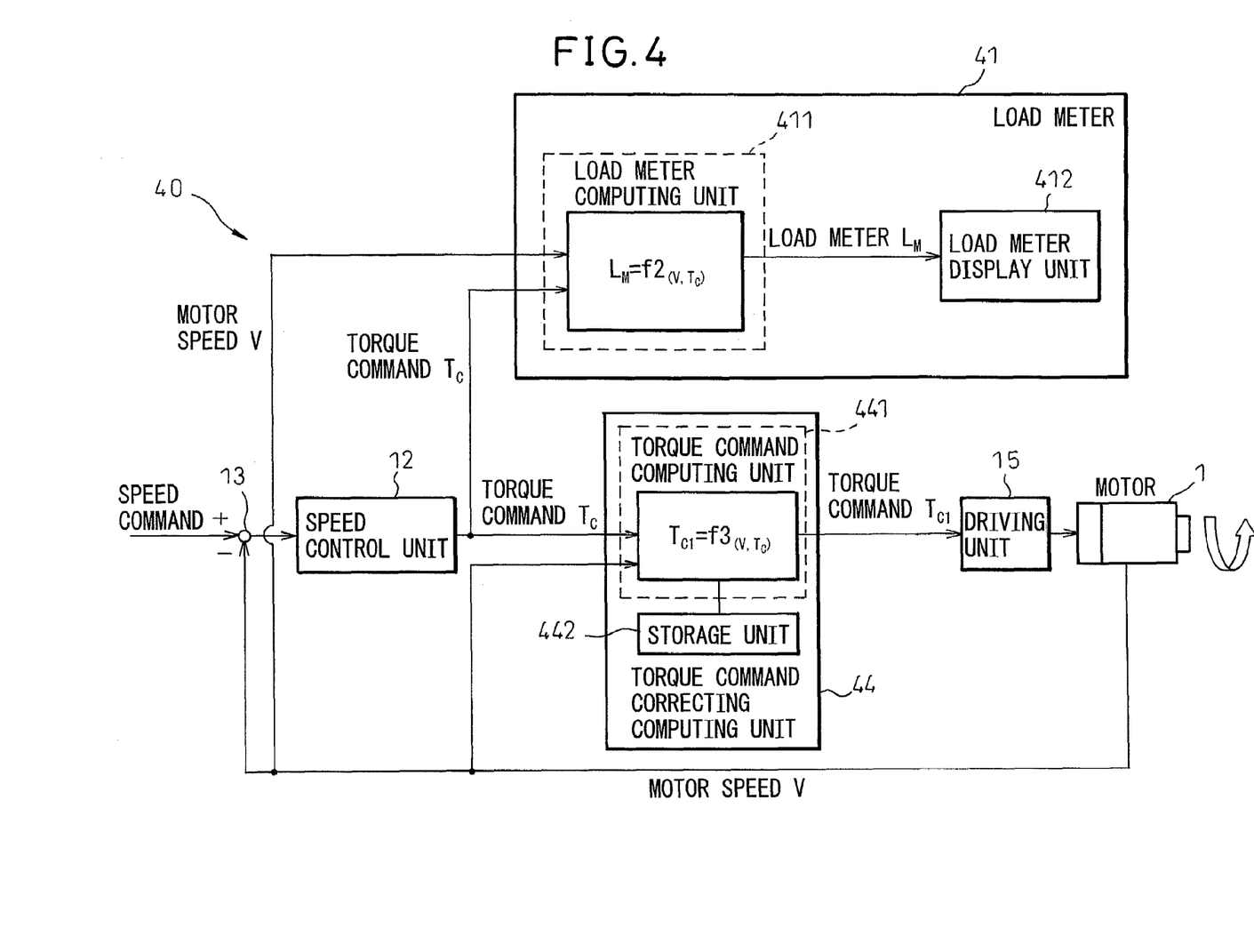
FIG. 4 is a block diagram showing the configuration of a motor control apparatus according to a second embodiment of the present invention.

FIG. 4 is a block diagram showing the configuration of a motor control apparatus according to a second embodiment of the present invention. As shown in FIG. 4, when the corrected torque command $T_{C1}$ is input to the motor, the motor can produce a torque of the correct value (that matches the displayed load meter value). In FIG. 4, a motor control apparatus 40 includes all the parts shown, except motor 1. As shown in FIG. 4, speed control unit 12 for motor 1 receives an output of adder 13 which shows the difference between the speed command and the actual speed V of motor 1, and outputs a torque command (or an electric-current command which is output from the driving unit to control the current supplied to the motor) $T_C$. A load meter 41 shown in FIG. 4 includes a load meter computing unit 411 and a load meter display unit 412. In FIG. 4, a torque command correcting computing unit 44 includes a torque command computing unit 441 and a storage unit 442.

For motor control apparatus 40 shown in FIG. 4, data representing the relationship between the torque command and the motor output is measured over the entire speed range of the motor to obtain the function (or table) $TC1=f3_{(V,TC)}$ ($T_C$: Torque command before correction, $T_{C1}$: Torque command after correction, V: Motor speed), and the function (or table) is stored in storage unit 442 so that it can be used in real time by torque command computing unit 441. The above function or table can be changed in accordance with either the motor temperature or the supply voltage or both.

Figure 5:
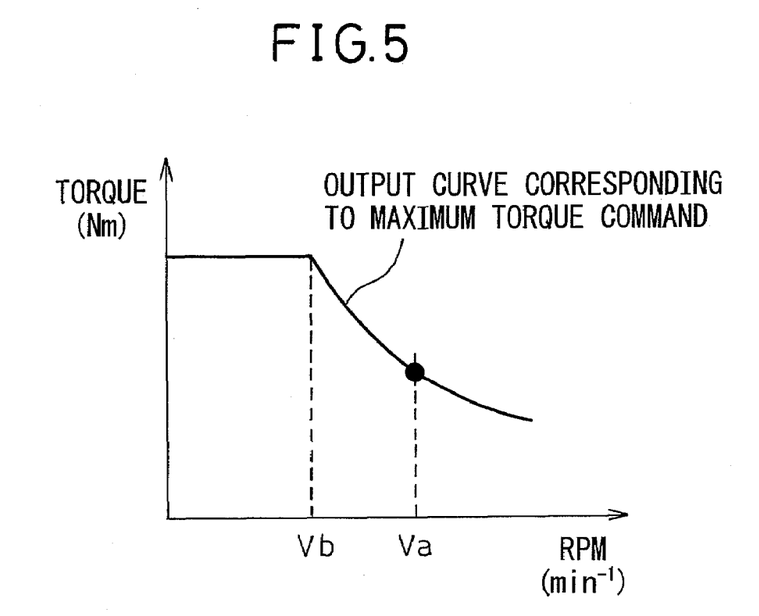
FIG. 5 is a diagram showing the relationship between motor rpm and output torque corresponding to a maximum torque command.

FIG. 5 is a diagram showing the relationship between the motor rpm and the output torque corresponding to the maximum torque command. FIG. 5 shows the output torque curve corresponding to the maximum torque command for a conventional motor. The output torque corresponding to the maximum torque command is constant until the base rpm (base speed) Vb is reached, but decays once the base rpm Vb is exceeded. The output torque corresponding to the maximum torque command at the rpm Va (>Vb) is about (Vb/Va)× 100% of the output torque corresponding to the maximum torque command at the base rpm Vb.

Figure 6:
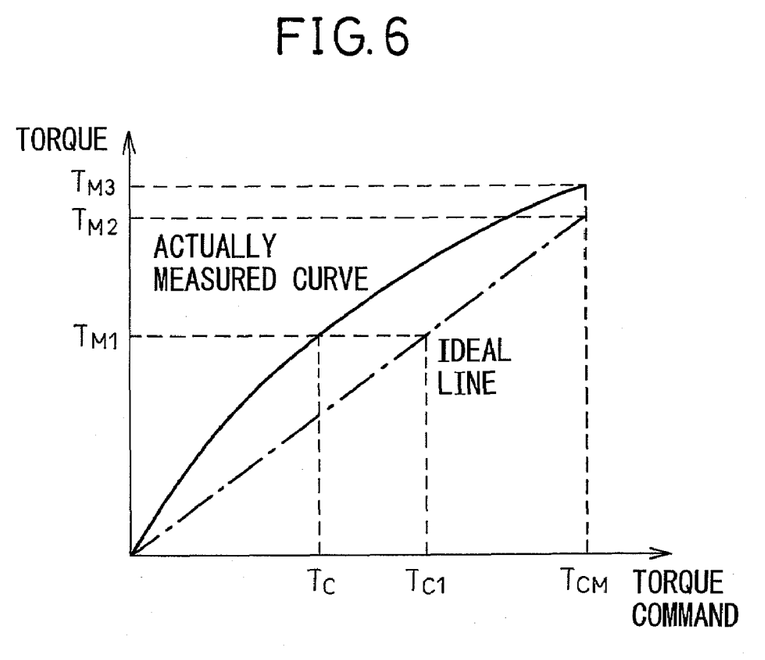
FIG. 6 is a diagram showing the relationship between torque command given to a motor and actually measured torque.
Figure 7:
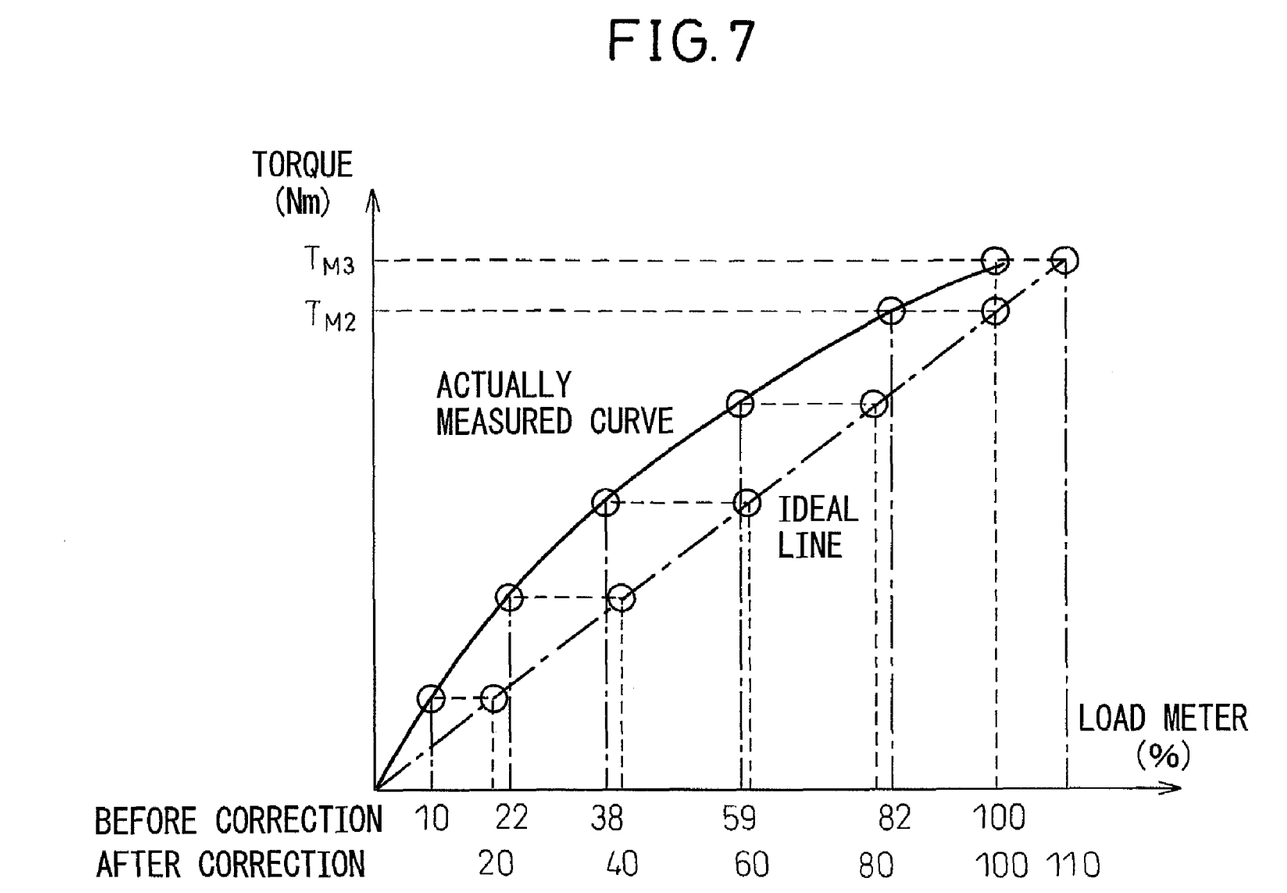
FIG. 7 is a diagram showing a display example of a load meter before and after correction according to the present invention.

FIG. 6 is a diagram showing the relationship between the torque command given to the motor and the actually measured torque, and FIG. 7 is a diagram showing a display example of the load meter before and after the correction according to the present invention. In FIGS. 6 and 7, an ideal line is shown by a semi-dashed line, and the actually measured motor torque curve is shown by a solid line. The ideal line was obtained by assuming that the rated torque of the motor was output. In FIG. 6, the horizontal axis represents the torque command to the motor, and the vertical axis represents the output torque required of the motor.

FIG. 6 shows a specific example of the actually measured curve as opposed to the ideal line, showing the torque command versus torque characteristic at a speed higher than the base speed Vb, at which the motor voltage reaches a maximum, for example, at the speed Va. When the torque command versus torque characteristic such as shown in FIG. 6 is assumed at a prescribed speed, the load meter displays before and after the correction of the torque command are as shown in FIG. 7. Before the correction, the load meter versus torque characteristic curve is not linear, and besides, the measured maximum torque $T_{M3}$ does not match the maximum load meter value (110%), therefore, the actual output torque cannot be accurately obtained from the load meter display value (%).

To correct the load meter display (so as to match the ideal line), the following correction calculation is performed so that the point ($T_C$, $T_{M1}$) on the actually measured curve corresponding to the detected torque command $T_C$ is brought onto the ideal line.

$$T_{C1}=T_{M1}/T_{M2}*T_{CM}$$

Here, $T_C$ is the torque command before the correction, $T_{C1}$ is the torque command after the correction, $T_{CM}$ is the maximum torque command, $T_{M1}$ is the actually measured torque, $T_{M2}$ is the ideal maximum torque, and $T_{M3}$ is the actually measured maximum torque.

As can be seen from FIG. 6, since the point ($T_C$, $T_{M1}$) on the actually measured curve corresponds to the point ($T_{C1}$, $T_{M1}$) on the ideal line, the relationship between the motor torque command and the output torque is expressed by the above equation.

Figure 8:
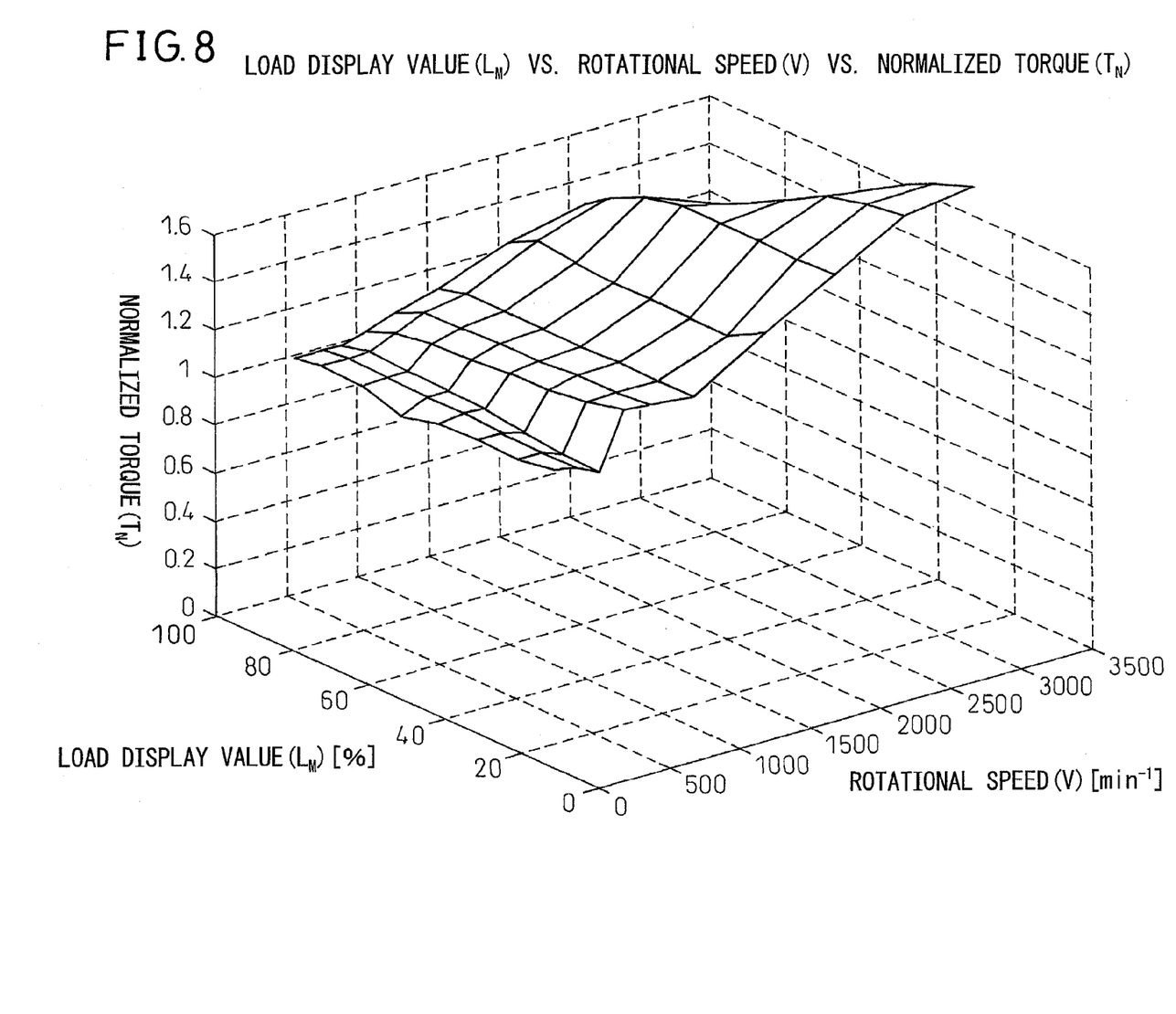
FIG. 8 is a diagram showing a load display value ($L_M$) versus rotational speed (V) versus normalized torque ($T_N$) characteristic before the correction of the torque command according to the present invention.
Figure 9:
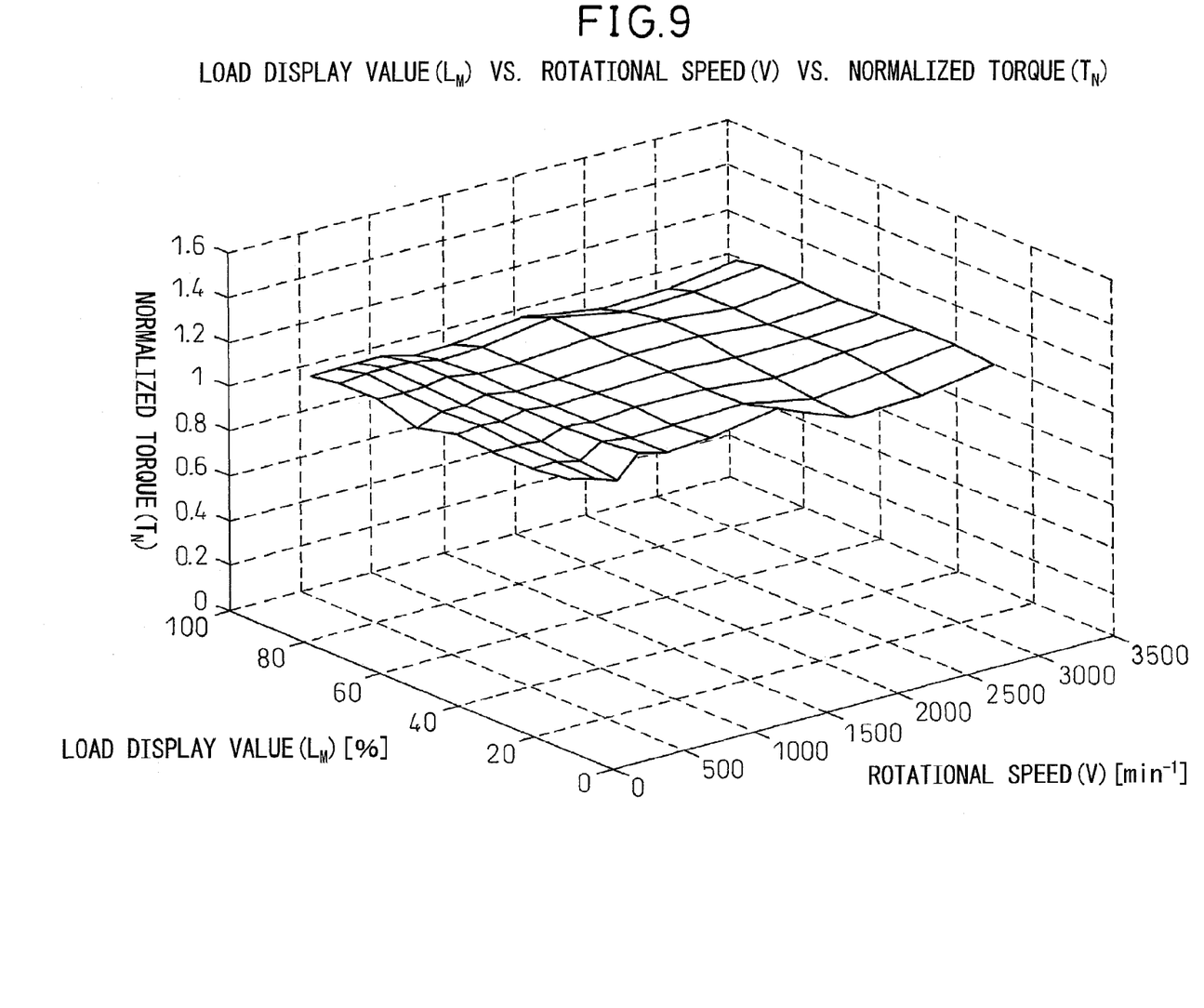
FIG. 9 is a diagram showing a load display value ($L_M$) versus rotational speed (V) versus normalized torque ($T_N$) characteristic after the correction of the torque command according to the present invention.

FIG. 8 shows the load display value ($L_M$) versus rotational speed (V) versus normalized torque ($T_N$) characteristic before the correction of the torque command according to the present invention, and FIG. 9 shows the same characteristic after the correction of the torque command. In FIGS. 8 and 9, a curved plane representing the load meter value versus speed versus normalized torque characteristic measured over the entire speed range of the motor is shown before the torque command to the spindle motor is corrected (FIG. 8) and after the command is corrected (FIG. 9).

In FIGS. 8 and 9, the load display value ($L_M$) and the normalized torque ($T_N$) are computed by the following equations.

Load display value($L_M$)=$T_C/T_{CM}$×100%

Normalized torque($T_N$)=$T_{M1}/T_D$(Ideal normalized torque($T_N$)=1)

where $T_C$ is the torque command, $T_{CM}$ is the maximum torque command, $T_{M1}$ is the actually measured torque, and $T_D$ is the torque value (value on the ideal line in FIG. 7) corresponding to $L_M$.

In FIG. 9, the reason that the torque command correction result does not perfectly match the ideal plane (the plane defined by the ideal normalized torque=1) is that the order of the correction function (or the size of the table) which affects the calculation accuracy is low. The higher the order of the correction function, the better the calculation accuracy. If the number of coefficients in the function is increased infinitely, the correction result will become a flat plane.

According to the present invention, a motor control apparatus can be provided that computes the load meter in such a manner as to accurately indicate the load condition of the motor in real time over the entire speed range of the motor including the nonlinear control region of the motor, and that controls the motor by using the thus computed value.

According to the load meter in the motor control apparatus of the present invention, the actual load condition can be accurately indicated by the spindle load meter value, thus providing extremely effective means, for example, when monitoring tool wear or when determining the cutting conditions.

What is claimed is:

1. A motor control apparatus for computing or outputting motor load information, comprising:
   a storage unit which stores a function or table obtained in advance based on parameters used for the computation of said load information and on actually measured values of a motor output or motor torque; and
   a load meter computing unit for
      computing, based on the function or table stored in said storage unit, a corrected value of the parameters used for the computation of said load information by matching (1) an actually measured relationship between the parameters and the motor's torque to (2) a predetermined relationship between the parameters and the motor's torque;
      substituting the computed corrected value of the parameters into a load meter computing function or table; and
      obtaining a correct value of the load information returned from the load meter computing function or table in response to the computed corrected value of the parameters.

2. A motor control apparatus as claimed in claim 1, wherein the parameters used for the computation of said load information are (i) an actually measured motor speed and (ii1) a torque command or (ii2) an electric-current command.

3. A motor control apparatus for driving a motor, said apparatus comprising:
   a function or table for computing a second torque command, wherein the function or table is obtained in advance by
      actually measuring the motor's speed and torque to establish an actually measured relationship between the motor's torque command and torque over a range of the motor's speed, and applying a correction to match the actually measured relationship to a predetermined relationship between the motor's torque command and torque, wherein a first torque command before said correction and on the actually measured relationship matches an actually measured torque which, in turn, matches the second torque command on the predetermined relationship; and a driving unit coupled to receive the second torque command from said function or table, and to drive the motor using said second torque command.

4. A motor control apparatus as claimed in claim 3, wherein motor load information is computed from said first torque command before said correction.

5. A motor control apparatus as claimed in claim 1, wherein said function or said table is changed in accordance with either motor temperature or supply voltage or both.

* * * * *